United States Patent [19]

Panda et al.

[11] Patent Number: 4,871,496

[45] Date of Patent: Oct. 3, 1989

[54] COMPOSITES COMPRISING SILICON CARBIDE FIBERS DISPERSED IN MAGNESIA-ALUMINATE MATRIX AND FABRICATION THEREOF AND OF OTHER COMPOSITES BY SINTER FORGING

[75] Inventors: Prakash C. Panda; Edgar R. Seydel; Rishi Raj, all of Ithaca, N.Y.

[73] Assignees: Jupiter Technologies, Inc.; Cornell Research Foundation, Inc., both of Ithaca, N.Y.

[21] Appl. No.: 230,738

[22] Filed: Aug. 11, 1988

Related U.S. Application Data

[63] Continuation of Ser. No. 815,857, Jan. 3, 1986, abandoned.

[51] Int. Cl.[4] .................. B29C 67/04; B29C 43/00; C04B 33/32
[52] U.S. Cl. ................................ 264/65; 264/56; 264/66; 264/320
[58] Field of Search ............ 501/88, 89, 95, 120; 264/60, 56, 65, 66, 319, 320

[56] References Cited

U.S. PATENT DOCUMENTS

| | | | |
|---|---|---|---|
| 4,410,468 | 10/1983 | Packer | 264/1.2 |
| 4,507,224 | 3/1985 | Toibana et al. | 501/89 |
| 4,543,345 | 9/1985 | Wei | 501/89 |
| 4,732,719 | 3/1988 | Panda | 264/65 |

FOREIGN PATENT DOCUMENTS 0067584 12/1982 European Pat. Off. .......... 501/88

OTHER PUBLICATIONS

Mah, T., et al., Ceramic Bulletin (ACerS), vol. 66, No. 2, 304–308 (1987).
Marshall, D. B., Ceramic Bulletin (ACerS), vol. 66, No. 2, pp. 309–317 (1987).
Tiegs, T. N., et al., Ceramic Bulletin (ACerS), vol. 66, No. 2, pp. 339–342 (1987).
Wang, J. G., et al., J. of Am. Cer. Soc., vol. 67, No. 6, 6/84, pp. 385–390.
Wang, J. G., et al., J. of Am. Cer. Soc., vol. 67, No. 6, 6/84, pp. 399–409.
Burke, J. J., et al. (editor), Bradt, R. C. (author), Advances on Deformation Processing, pp. 405–421, Plenum Press, NY, 1978.
Panda, P. C., Ph.D. Thesis Titled "Studies on Phase Transformation Kinetics, Superplastic Deformation and Dynamic Recrystallization of Magnesia-Alumina Spinel, $MgO.2Al_2O_3$", Cornell University, NY, 8/84.
Alper, A. M., High Temperature Oxides, Part III, Academic Press (1970), pp. 235–281.
Baudelet, B., Superplasticity, Conference Internationale, Grenoble, France, 9/16–19/1985, pp. 16.1–16.19.
Bailey, J. T., et al., Traus. British Ceramic Society, vol. 68, No. 4, 1969 (pp. 159–164).
Bratton, R. J., Ceramic Bulletin, vol. 48, No. 8, pp. 759–762 (1969).
Bratton, R. J., et al., J. Materials Science, 7 (1972), pp. 1363–1368.
Brissette, L. A., et al., J. Amer. Ceramic Soc., vol. 49, No. 3, pp. 165–166 (3/66).
Budnikov, P. P., et al., Proc. British Ceramic Soc., 33, 69–76 (1983).

(List continued on next page.)

Primary Examiner—Jan H. Silbaugh
Assistant Examiner—Neil M. McCarthy

[57] ABSTRACT

A novel ceramic-ceramic composite of a uniform dispersion of silicon carbide fibers in a matrix of $MgO\cdot nAl_2O_3$ wherein n ranges from about 1 to about 4.5, said composite comprising by volume from 1 to 50% silicon carbide fibers and from 99 to 50% $MgO\cdot nAl_2O_3$. The composite is readily fabricated by forming a powder comprising a uniform dispersion of silicon carbide fibers in poorly crystalline phase comprising MgO and $Al_2O_3$ in a mole ratio of n and either (a) hot pressing or preferably (b) cold pressing to form a preform and then forging utilizing a temperature in the range of 1100° C. to 1900° C. and a strain rate ranging from about $10^{-5}$ seconds $^{-1}$ to about 1 seconds $^{-1}$ so that surfaces cracks do not appear to obtain a shear deformation greater than 30%.

5 Claims, 2 Drawing Sheets

OTHER PUBLICATIONS

Extended Abstracts, American Ceramic Society, 87th Annual Meeting, 5/5-5/9, 1985, p. 82, Abstract 7-C-85.
Hamano, K., et al., Yogyo-Kyokai-Shi 85[5 1977, pp. 225-230.
Heuer, A. H., et al., J. of American Ceramic Society, vol. 52(9), pp. 468-474 (1969).
High-Tech Materials Alert, 6/86, p. 4.
Kanzaki, S., et al., Yogyo-Kyokai-Shi, 91, [2], 1983, pp. 81-86.
Kanzaki, S., et al., Yogyo-Kyokai-Shi, 91, [4], 1983, pp. 165-1770.
Kazaki, S., et al., Yogyo-Kyokai-Shi, 91, [7], 1983, pp. 344-346.
Mitchell, P. W. D., J. of American Ceramic Society, vol. 55, No. 3, p. 484, 1972.
Obsorn, E. F., J. of the American Ceramic Society, vol. 36, No. 5, 5/53, pp. 147-151.
Panda, P. C., et al., J. of the American Ceramic Society, vol. 68, No. 10, 10/85, pp. 522-529.
Rhodes, W. H., et al., J. of the American Ceramic Society, vol. 58, (No. 1-2), pp. 31-34 (1-2/75).
Taylor, D., Processing of the British Ceramic Society, No. 33, 5/83, pp. 17-32.

COMPOSITES COMPRISING SILICON CARBIDE FIBERS DISPERSED IN MAGNESIA-ALUMINATE MATRIX AND FABRICATION THEREOF AND OF OTHER COMPOSITES BY SINTER FORGING

This application is a continuation of application Ser. No. 815,857, filed Jan. 3, 1986, now abandoned.

The invention herein was made in part under Department of Energy Grant DE-AC01-84ER80167, creating certain rights in the United States Government. The invention was also made in part under New York State Science and Technology Grant SBIR 1985-10.

TECHNICAL FIELD

This invention is directed to ceramic-ceramic composites, that is composites in which the matrix and the fiber phase are both ceramic, especially those composites where the fiber phase is silicon carbide. These are useful for structural applications at temperatures ranging from ambient to very high temperatures such as those encountered in gas turbine engines.

This invention is also directed to fabricating these composites.

BACKGROUND OF THE INVENTION

Ceramic-ceramic composites are known where the matrix reinforced with silicon carbide fibers is lithia-aluminosilicate, alumina, silicon nitride, zirconia, molybdenum disilicide, or lead zirconium titanate, etc.

While these materials by in large have suitable strengths both at ambient and at high temperatures, some applications are benefited by high strengths at ambient up to 1000° C. and higher but also higher strengths than have heretofore been obtained with many ceramic-ceramic composites at temperatures on the order of 1200° C.–1300° C.

Ceramic parts are normally fabricated from ceramic-ceramic composites by hot pressing a loose powder (with silicon carbide fibers uniformly distributed therein) into pancake or billet form and then machining to final form. In hot pressing, the loose powder may not densify uniformly, and this leads to poor uniformity in strength in products produced therefrom. Furthermore, hot pressing is only carried out in closed die which requires precise control of the amount of material being fabricated.

SUMMARY OF THE INVENTION

In one aspect of the invention herein there is provided a novel ceramic-ceramic composite which comprises silicon carbide fibers dispersed in a magnesia-aluminate spinel matrix. While magnesia aluminate spinel material is known, it has not heretofore been suggested to incorporate silicon carbide fibers in a matrix of such and surprisingly this combination provides very advantageous characteristics. Firstly, the novel ceramic-ceramic composite herein is advantageous in providing high flexural strength not only at ambient temperature up to 1000° C. but also high flexural strengths at 1200° C.–1300° C. Secondly, the novel ceramic-ceramic composite herein has the advantage that one manner of its preparation involves a dynamic phase change from poorly crystalline phase matrix to fully crystalline phase matrix and this dynamic phase change contributes to reduction of flow stress thereby facilitating forging and die design.

In another aspect of the invention herein, the above-identified novel ceramic-ceramic material or other ceramic-ceramic materials are readily formed into net shape by cold pressing a starting powder to form a preform and then forging (i.e. isothermally pressing in an open die or in a closed die) to obtain a shear deformation greater than 30%. This allows a preform to be used which can be designed to have a shape related to that of the final product so that flow of material during processing can be controlled to provide much more uniform strength results even with intricate shapes than is obtained with hot pressing. Furthermore, when the forging is carried out in an open die, the quantity of material need not be precisely controlled to obtain a precise shape of the finished part with only finish machining being necessary. When the forging is carried out in a closed die, while precise control of material is necessary, precise shapes can be obtained without even finish machining. On the other hand, hot pressing requires material control and substantial machining.

The novel ceramic-ceramic composite material herein comprises a uniform dispersion of silicon carbide fibers in a matrix of $MgO.nAl_2O_3$ wherein n ranges from about 1 to about 4.5 and the silicon carbide fibers amount to from about 1% to about 50% by volume of the composite material and the $MgO.nAl_2O_3$ amounts to from about 99% to about 50% by volume of the composite material. The phase diagram for the matrix material is described in E. F. Osborn, "Subsolidus Reactions in Oxide Systems in the Presence of Water at High Pressures", *J. Amer. Ceram. Soc.*, 36 (5), p. 147–151 (1953).

The % by volume of the constituents is readily determined in the finished product by conversion to volume of two dimensional measurements on a cross section micrograph; the volume fractions are readily converted to weight fractions based on densities.

The process herein for preparing ceramic-ceramic net shape parts of the novel ceramic-ceramic composite material described above wherein forging is utilized instead of hot pressing comprises the steps of (a) cold pressing a starting powder to obtain a preform of green density ranging from about 30% to about 75% of the theoretical density of the composite, said starting powder comprising particles consisting essentially of a dispersion of silicon carbide fibers in a mixture of crystalline or poorly crystalline phase containing MgO and $Al_2O_3$ in a mole ratio of n moles of $Al_2O_3$ to 1 mole of MgO wherein n is as defined above, said MgO and $Al_2O_3$ being present in relative amounts to provide the aforestated volume percentages of silicon carbide fibers and $MgO.nAl_2O_3$, and (b) isothermally pressing in an open die or in a closed die to substantially final shape in an inert atmosphere (e.g. argon) or under vacuum utilizing a temperature within the range of about 1100° C. to about 1900° C. and strain rate within the range of about $10^{-5}$ seconds$^{-1}$ to about 1 seconds$^{-1}$, the temperature and strain rate being such that surface cracks do not occur, said pressing being carried out to obtain a shear deformation greater than 30% and a density at least about 98% of the theoretical density of the composite, preferably at least about 100% of the theoretical density of the composite, to provide a matrix of $MgO.nAl_2O_3$ wherein said silicon carbide fibers are uniformly dispersed. Such an amount of shear deformation is normally obtained by pressing to reduce the vertical height dimension of a specimen in the range of 30% to 60%.

The term "shear deformation" is used herein to mean a change in configuration as distinguished from a change only in volume.

The term "uniform dispersion" of silicon carbide fibers in a matrix of MgO.nAl$_2$O$_3$ is used herein to mean that each cubic inch of a fabricated part contains the same amount by volume of fibers within about ±5%.

The theoretical densities of the composite as used herein are calculated based on the rule of mixtures.

The term "net shape" parts is used herein to mean essentially final dimensions whereby little or no machining is necessary.

DETAILED DESCRIPTION OF THE INVENTION

Turning firstly to the novel ceramic-ceramic composites herein, said composites preferably comprise by volume from about 10% to about 35% silicon carbide fibers and from about 90% to about 65% MgO.nAl$_2$O$_3$ very preferably, n in MgO.nAl$_2$O$_3$ is 2. The silicon carbide fibers are short fibers and preferably have a length ranging from about 10 μm to about 1000 μm and very preferably from about 20 μm to about 100 μm. The silicon carbide fibers ordinarily have diameters ranging from about 0.2 μm to about 10 μm. The composites herein possess not only good flexural strengths at room temperatures, e.g. about 300 to about 500 megapascals, but also flexural strengths in excess of 100 megapascals at 1200°-1300° C.

We turn now to the process herein for forming the novel ceramic-ceramic composite material where a forging step is utilized.

The cold pressing step, i.e. step (a) above, is readily carried out, for example, by first cold compacting the starting powder in a double action die to 7 to 50 megapascals and then enclosing the formed workpieces in latex balloons and cold isostatically pressing (i.e., using a device wherein pressure is transmitted via liquid, such as oil, to the workpiece which is surrounded by the liquid) to 100 to 350 megapascals.

Preferably the cold pressing step is carried out to provide a density which is 40% to 60% of the theoretical density of the composite. Preferably, the cold pressing step is carried out to obtain a green density ranging from about 1.4 to about 2.1 megagrams per cubic meter.

The starting powder utilized in the cold pressing step preferably has a matrix material particle size ranging from about 0.005 μm to about 50 μm, very preferably from about 0.005 μm to about 1.0 μm. The silicon carbide fiber sizes have been described above.

Preferably the starting powder utilized in the cold pressing step is formed by (i) forming an aqueous solution of magnesium nitrate with aluminum hydroxide particles and silicon carbide fibers dispersed therein, the relative amounts of silicon carbide fibers and magnesium nitrate and aluminum hydroxide being such as to provide the selected volume percentages of silicon carbide fibers and MgO.nAl$_2$O$_3$ on conversion of the magnesium nitrate and aluminum hydroxide to MgO.nAl$_2$O$_3$, (ii) drying to obtain a dry to the touch powder containing uniform dispersion of the silicon carbide fibers (e.g. heating at 60° C. to 80° C. with continuous stirring until most of the water is gone and then freeze drying or oven drying, e.g. at 110° C. for 2-3 hours), (iii) calcining (e.g. in air) at a temperature ranging from about 600° C. to about 1100° C. to convert the magnesium nitrate to MgO and the aluminum hydroxide to AlO(OH) or to Al$_2$O$_3$ as determined by the calcining temperature and to provide a uniform dispersion of the silicon carbide fibers in the resulting poorly crystalline matrix, and (iv) size reducing (e.g. by ball milling with high purity alumina balls for 16-24 hours) to a particle size as aforestated.

Alternatively, coprecipitation or sol gel techniques can be used in place of step (i). Coprecipitation is normally carried out by dissolving magnesium and aluminum salts, e.g. magnesium chloride and aluminum chloride, dispersing silicon carbide fibers and then changing the pH to cause coprecipitation of hydroxides to form a uniform admixture of hydroxides and silicon carbide fibers. Sol gel processing involves making a gel e.g. by dissolving alkoxides of aluminum and magnesium in alcohol, dispersing silicon carbide fibers, and controlling pH to form a gel with silicon carbide fibers dispersed therein.

If desired, step (iii) can be carried out by calcining in a reducing atmosphere such as hydrogen. If calcining is carried out in an inert atmosphere, the resulting powder can be treated with HF acid. These treatments are optional and eliminate glassy phase which may otherwise form and can improve mechanical properties in the ultimate product.

An alternative process for forming the starting powder for the cold pressing step comprises thoroughly admixing MgO, Al$_2$O$_3$ and silicon carbide to form a uniform admixture and size reducing to appropriate particle size if necessary.

The preform resulting from the cold pressing step can optionally be partially sintered to a density from about 50 to about 95 percent of the theoretical density of the composite. This is readily carried out at a temperature ranging from about 1300° C. to about 1900° C.

We turn now to the forging step, i.e. step (b) set forth above.

For the preferred product where the ceramic-ceramic composite comprises a uniform dispersion of silicon carbide fibers in a matrix of MgO.nAl$_2$O$_3$ wherein n is about 2 and where the silicon carbide fibers are present in the composite in an amount ranging from about 10% to about 35% by volume and where the MgO.nAl$_2$O$_3$ is present in the composite in an amount ranging from about 90% to about 65% by volume, step (b), i.e. the forging step, is preferably carried out at a temperature ranging from about 1200° C. to about 1625° C. and strain rate within the range of about $10^{-4}$ to about $10^{-2}$ seconds $^{-1}$.

Preferably, step (b), i.e. the forging step, is carried out utilizing an open die. The term "open die" is used herein to mean a die wherein on pressing the workpiece does not contact the die sidewall. A closed die (i.e. a die where on pressing the workpiece does contact die sidewall) is an alternative especially where the preform subjected to forging has a density less than 75% of the theoretical density of the composite and minimizes the need for finish machining. The die in both the open and closed die cases has a piston which preferably is of an alloy of either tungsten (e.g. thoriated tungsten or tungsten carbide) or molybdenum(e.g. Mo-Hf-C, MoTiC or TZM). Thoriated tungsten is very suitable where low flow stresses are present such as with the ceramic-ceramic composition made by the preferred process herein as described above. Graphite is also a very suitable die material but with graphite some reaction with the die may occur and this is evidenced by some dark areas or spots on the surface of the forging which are readily removed by finish machining.

Very preferably, step (b) is carried out utilizing substantially the maximum strain rate where surface cracks do not occur and the minimum temperature where said maximum strain rate produces no surface cracks. This minimizes processing time and energy requirements.

Step (b) is readily carried out utilizing constant displacement rate, constant strain rate, constant load or constant stress, preferably at a temperature ranging from about 1200° C. to about 1625° C.

The constant displacement rate method is readily carried out by placing the preform formed in step (a), or from partial sintering if a partial sintering step is used, on a support structure (e.g. the bottom half of a die or a flat platen) in a furnace providing the appropriate temperature and utilizing a piston (e.g. a screw or hydraulic or pneumatic driven piston such that displacement rate is controllable) to press the workpiece from above moving the piston at a constant displacement rate which is readily determined from the equation $$L = \epsilon_o h$$

wherein L is the displacement rate, $\epsilon_o$ is the initial strain rate, and h is workpiece height and initial strain rate $a_o$ preferably ranges from about $10^{-5}$ to about $10^{-2}$ seconds $^{-1}$ and is selected to be such that surface cracks do not occur. The term "displacement rate" is used herein to mean the relative rate of approach of the upper movable piston relative to the bottom piston or platform or other support structure. In this method the strain rate keeps increasing as the forging progresses. For example, if the initial strain rate is $\times 10^{-3}$ seconds $^{-1}$, then strain rate increases to $2 \times 10^{-3}$ seconds $^{-1}$ (i.e. becomes twice the initial value) when the height of the preform or the workpiece is reduced by half the initial height.

The constant strain rate method is readily carried out utilizing apparatus as used for the constant displacement method wherein piston movement is controlled responsive to a microprocessor programmed to vary displacement rate as workpiece height decreases to maintain constant strain rate in accordance with the equation $$L = \epsilon h$$

wherein L is the displacement rate, $\epsilon$ is strain rate and h is workpiece height. Preferably this method is carried out utilizing a strain rate in the range of about $10^{-5}$ to about $10^{-2}$ seconds $^{-1}$.

The constant load method is readily carried out with the same apparatus as disclosed for the constant displacement method by moving the piston by a constant load force (utilizing a constant load weight positioned on the piston to move the piston). The load P is readily calculated from the equation $P = 2 \sigma A$ where A is the initial cross-sectional area of the workpiece (i.e. the cross-sectional area of the sintered preform) and the factor of 2 is used to account for the increase in area during the forging process as the preform gradually assumes the shape of the final part and $\sigma$ is the stress that corresponds to initial strain rates as set forth above for the constant displacement rate method.

The constant stress method is readily carried out with apparatus as described for the constant displacement method modified to include variable load applying means where varying of the load is controlled responsive to a microprocessor programmed to vary load as workpiece cross-sectional area increases to provide a constant stress in accordance with the equation $$P = \sigma A$$

where P is the load, $\sigma$ is stress and A is the cross-sectional area of the workpiece. Flow stresses should be less than 300 megapascals and preferably should range from about 1 to about 100 megapascals.

In each of the four methods described above for step (d), the forging (i.e. pressing) is stopped when appropriate dimensions of the part being formed have been achieved as estimated from the total displacement applied to the piston utilized for the pressing.

As previously indicated the conditions of forging are selected so that no surface cracks occur in the workpiece. The term "surface cracks" is used herein to mean cracks visible to the naked eye as well as fine cracks that can be observed under magnification of 70X.

The conditions of forging are readily selected empirically, e.g. by deforming preform samples at a plurality of strain rates and temperatures and determining whether cracks occur and graphing the results in terms of strain rates and temperatures and selecting strain rates and temperatures in the area of the graph where processed samples did not exhibit surface cracks. Typically, this can be carried out in uniaxial compression tests utilizing compression rods (i.e. push rods or pistons or anvils), and cylindrical preform specimens positioned with flat face against the compression rod.

In a preferred method of empirical determination, cylindrical preform samples having a diameter ranging from about 5 to about 10 mm and a height ranging from about 5 to about 15 mm are forged, i.e. isothermally pressed by means of a constant displacmeent rate tester (e.g. an Instron Universal Testing Machine manufactured by Instron Corp. of Canton, Mass., which is conventionally referred to as an Inston Tester or Instron Machine) under open die conditions in an inert atmosphere in a furnace in a range of constant temperatures and displacement rates (the piston attached to the crosshead of the Instron Tester is moved at a selected constant displacement rate and a selected temperature is provided in the furnace) to reduce the height by about 30% to about 60% and noting which of the samples are free of surface cracks and graphing the results in terms of initial strain rates (determined from the equation $L = \epsilon_o h$, and described hereinbefore) versus temperatures and selecting strain rates and temperatures for use in step (b) in the area of the graph where the processed samples did not exhibit surface cracks. The graph obtained indicates a safe area on and under a curve. Preferably step (b) is carried out utilizing an initial strain rate (in constant displacement rate forging) that is substantially the maximum one where no surface cracks were noted in the testing of the samples and at the minimum temperature where testing indicated said substantially maximum strain rate produces no surface cracks.

Recording of load and displacement during said testing provides data for making up stress versus strain rate curves whereby the strain rates determined by testing are convertible to stress and load for use in carrying out step (b) by constant load and constant stress methods.

After step (b) is completed, some finish machining may be required to clean the edges. Near net shape constituting close tolerances is obtained in open die processing by selection of preform shape and carrying out of step (b) to appropriate displacement. The processing provides uniform parts meeting close tolerances and containing a minimum of flaws. The parts demonstrate a high degree of reliability, i.e. uniformity in resistance to failure in use. Generally the produced parts have an excellent surface finish and polishing is not necessary.

Parts of the novel ceramic-ceramic herein can also be made by the conventional hot pressing method but this is much less desirable than the forging method described above. The material utilized in forming parts by hot pressing is the starting powder described hereinbefore, i.e. the starting powder comprising particles consisting essentially of a dispersion of silicon carbide fibers in a mixture or poorly crystalline phase containing MgO and $Al_2O_3$ in a mole ratio of n moles of $Al_2O_3$ to 1 mole of MgO wherein n is defined as above, the silicon carbide fibers and mixture or poorly crystalline phase being present in relative amounts to provide the aforestated volume percentages of silicon carbide fibers and $MgO \cdot nAl_2O_3$ on formation of the ceramic-ceramic herein. The starting powder has a matrix material particle size ranging from about 0.005 $\mu$m to about 50 $\mu$m, very preferably from about 0.005 $\mu$m to about 1 $\mu$m. The starting powder for hot pressing is readily made the same as that used in the preferred cold pressing/forging process, i.e. preferably by forming an aqueous solution of magnesium nitrate and aluminum hydroxide with silicon carbide fibers dispersed therein, drying, calcining and size reducing, or alternatively by thoroughly admixing MgO, $Al_2O_3$ and silicon carbide fibers to form a substantially uniform admixture and size reducing if necessary. In the hot pressing, the loose powder is filled into a closed die and it is uniaxially pressed in the closed die at a temperature ranging from about 1100° C. to about 1900° C., under a fixed load, e.g. about 25 megapascals to about 100 megapascals, for a time period ranging, for example, from about 5 minutes to about 2 hours, to obtain a density at least 98% of the theoretical density of the composite, preferably at least about 100% of the theoretical density of the composite. Normally a billet or pancake shape is formed, and this is machined to final shape.

A preferred composition and the forging process herein are illustrated in the following detailed example wherein convex lens shaped parts are obtained from intermediate cylindrical preforms.

EXAMPLE

A starting powder was prepared as follows: 20.908 grams of analytical grade magnesium nitrate, $Mg(NO_3)_2 \cdot 6H_2O$ was dissolved in 200–300 ml distilled water in a pyrex container. To this solution was added 25.44 grams of analytical reagent grade $Al(OH)_3$ and 7.606 grams silicon carbide short fibers (30 $\mu$m long and 0.1 $\mu$m in diameter). The resulting slurry of fibers and aluminum hydroxide in a solution of magnesium nitrate was heated at 70° C. with continued stirring until an essentially dry powder was obtained. The powder was then baked at 110° C. for 3–4 hours to assure low moisture content After this, the mixture was transferred to an alumina crucible and calcined at 700° C. for 2 hours. The resultant powder was vibrated for 0.5 hours and then milled with high purity aluminum balls in a polyethylene container to form a starting powder comprising particles consisting essentially of a dispersion of silicon carbide fibers in a poorly crystalline matrix of MgO and $Al_2O_3$ in a mole ratio of 2 moles of $Al_2O_3$ to 1 mole of MgO where the particles in the matrix had a maximum dimension of about 5 $\mu$m. The composition contained by weight 11.94% MgO, 60.42% $Al_2O_3$ and 27.64% silicon carbide.

The starting material was cold pressed into cylindrical blanks by first cold-compacting in a double action die to 35 megapascals and then cold isostatically pressed to 200 megapascals. The resulting preforms had a density about 45% of the theoretical density of the composite, i.e. a green density of 1.56 megagrams per cubic meter. The diameters ranged from 5 mm to 26 mm.

The specimens were then hot forged to lens shaped parts at 1583° C. and an initial strain rate of $1.4 \times 10^{-3}$ seconds $^{-1}$ under uniaxial compression in an argon atmosphere utilizing apparatus consisting of a piston (diameter of 26 mm) and die positioned in a furnace. The forging consisted of isothermal pressing in an open die and was carried out at a constant displacement rate of 1.0 millimeters per minute (preform height being about 12 mm and diameter about 25 mm) to obtain a reduction in height of about 55% and a shear deformation of greater than 30%. The piston and die were of graphite lined with graphite foil. The furnace was of tungsten mesh and contained radiation shields of tungsten and molybdenum.

The as-forged specimens had a density greater than 98% of theoretical density and were of ceramic-ceramic composite comprising a uniform dispersion of silicon carbide fibers in a matrix of $MgO \cdot 2Al_2O_3$ wherein the composite contained about 30% by volume silicon carbide fibers and 70% by volume $MgO \cdot 2Al_2O_3$.

All surfaces of the as-forged specimens including the curved edges were free of cracks including microcracks. The specimens were forged to final shape and required no machining to obtain this. The specimens contained some black patches due to reaction with graphite in the die; this is readily removed by finish machining.

In another case, specimens were made the same as above but the silicon carbide fibers were left out. The flow stress encountered on sinter forging this was about 5 megapascals. The flow stress encountered in forging fully dense hot pressed material under the same conditions of strain rate and temperature was about 150 megapascals. (See "*Superplastic Deformation in Fine-Grained $MgO \cdot 2Al_2O_3$ Spinel*", P. C. Panda, P. E. D. Morgan and R. Raj, Journal of American Ceramic Society, Vol. 68, No. 10, Page 522-529 (October, 1985).

The flow stress encountered on forging the preform to final shape for the ceramic ceramic composite in the working example herein was 3 megapascals which was 2 megapascals smaller than the flow stress encountered on forging the preform to final shape for the composition without silicon carbide fibers This drop in flow stress was unexpected since the addition of non-deformable fibers is normally expected to lead to increase in flow stress, and it is theorized that this is due to oxidation of some silicon carbide fibers to silica during calcining and formation of glassy phase due to reaction of silica, magnesia and alumina. Without glassy phase, it is estimated that flow stress encountered on forging the poorly crystalline matrix silicon carbide mixture would be 6-60 megapascals, still a substantial reduction compared to pressing fully dense material.

Specimens for flexural strength measurements were cut from forge specimens with a diamond saw. The specimens were 20 mm to 25 mm long, 2.7 mm wide and 2 mm to 2.5 mm in height. The specimens surfaces were ground with 600 grit silicon carbide paper. Edges were not beveled. Modulus-of-rupture as a function of temperature was measured under a constant cross-head displacement rate of 0.5 mm/minute with a screw driven mechanical testing machine equipped with a tungsten mesh heating element furnace. All testing other than at room temperature was performed in argon atmosphere.

Figure 1:
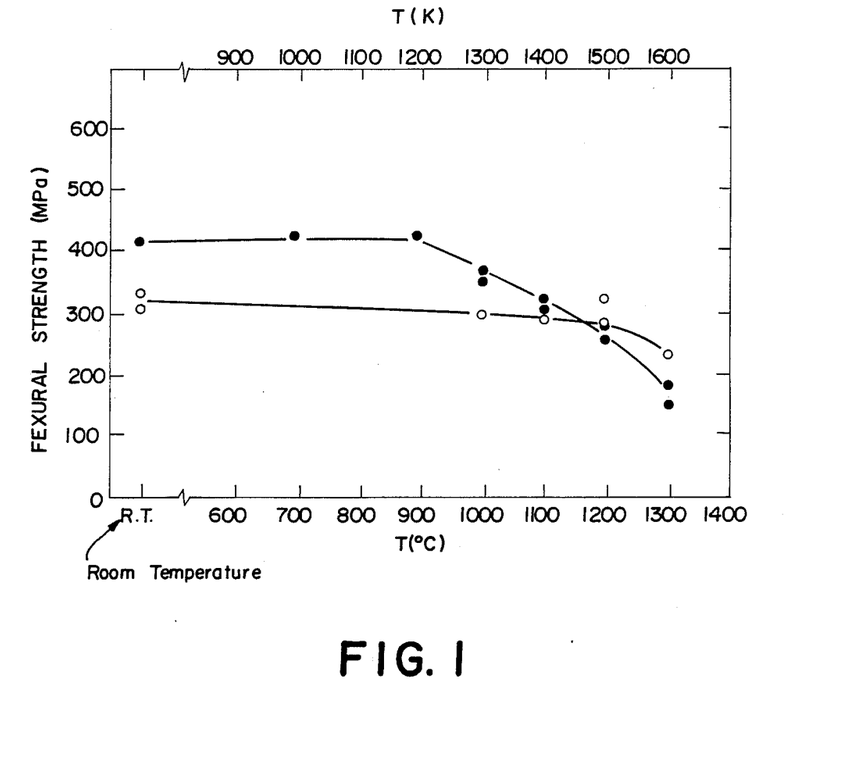
FIG. 1 is a graph of flexural strength versus temperature and graphically presents results of the detailed example herein and compares results for the spinel with silicon carbide fibers therein to results for the spinel alone.

The results are shown in FIG. 1 wherein flexural strength (modulus-of-rupture) in megapascals (MPa) is related to temperature. Each point on the graph represents test results on one specimen. The solid dots represent the specimens of ceramic-ceramic material wherein 30% silicon carbide fibers were dispersed in a matrix of MgO.2Al$_2$O$_3$, i.e. novel ceramic-cetamic according to the invention herein. The open dots represent the specimens of MgO.2Al$_2$O$_3$ without silicon carbide fibers.

As seen in FIG. 1, the room temperature strength of the invention composition is substantially higher than for the pure spinel (no SiC), and is 415 megapascals compared to 320 megapascals for the pure spinel. At 1200° C. both had a strength of 275 megapascals.

Thus the novel ceramic-ceramic composite material herein is shown to have advantageous strengths for ceramic-ceramic silicon carbide containing composites, i.e. good strength at room temperature coupled with higher strengths at 1200° C.-1300° C. than have heretofore been obtained with many ceramic-ceramic composites.

With reference to FIG. 1, the very close values of flexural strength of specimens forged under the same conditions should be noted (shown by the small scatter in properties between two samples at 1000° C., 1100° C., 1200° C. and 1300° C.). This shows that the forging process herein produces highly reliable parts, i.e. parts processed the same have essentially the same strength properties.

Figure 2:
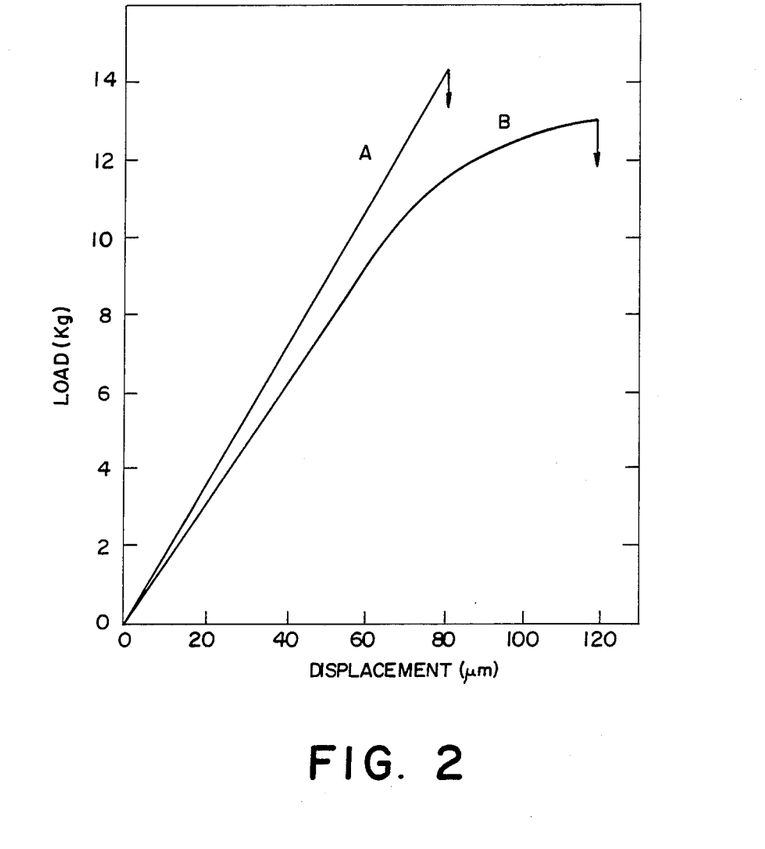
FIG. 2 is a graph of load versus displacement and graphically presents results of the detailed example herein and compares the ductility and failure point of the spinel with silicon carbide fibers therein to results for the spinel alone in a three-point-bend test.

FIG. 2 is a graph of load in kilograms (Kg) vs. displacement (μm) obtained in three point bend tests at 1573° K. with the curve denoted B being for the novel composite of the invention of MgO.2Al$_2$O$_3$ with 30% by volume silicon carbide fibers and the curve denoted A being for the samples of MgO.2Al$_2$O$_3$ without silicon carbide fibers. As is seen from FIG. 2, the novel ceramic-ceramic composites of the invention are more ductile than for the MgO.2Al$_2$O$_3$ without silicon carbide. Curve B indicates that the novel composition herein possesses sufficient ductility for structural applications.

The process in this example is modified to include sintering of the preform at 1700° C. for 3 hours to 95% of the theoretical density of the composite prior to forging with similar results of forging to essentially final shape without surface cracks occurring.

The starting material in this example is readily formed into a billet by hot pressing at 70 megapascals at 1600° C. for 0.5 hours. The billet is of the novel ceramic-ceramic composite as above but must be machined to final shape.

It has been discovered herein that the hot forging process as above is beneficial generally in forming ceramic-ceramic composite parts. In particular, it has been discovered herein that ceramic-ceramic composite parts which are relatively flaw free and need little or no machining wherein the ceramic-ceramic composite comprises a uniform dispersion of silicon carbide fibers in a matrix of oxide or nitride ceramic wherein the silicon carbide fibers amount to from about 1% to about 50% by volume of the composite and wherein the matrix of oxide or nitride ceramic amounts to from about 99% to about 50% by volume of the composite, are prepared by a process comprising the steps of (a) cold pressing a starting powder comprising a uniform dispersion of silicon carbide fibers in the crystalline oxide or nitride ceramic or in poorly crystalline precursor thereof to form a preform having a density which is about 30% to about 75% of the theoretical density of the composite, and (b) isothermally pressing in an open die or in a closed die to substantially final shape in an inert atmosphere (for processing oxides) or nitrogen atmosphere (for processing nitrides) utilizing a temperature within the range of about 1000° C. to about 2000° C. and strain rate within the range of 10-6 seconds $^{-1}$ to about 1 seconds $^{-1}$ so as to obtain a shear deformation greater than 30% without surface cracks occurring and a density greater than about 98% of the theoretical density of the composite. Such an amount of shear deformation is normally obtained by pressing to reduce the vertical height dimension of a specimen in the range of 30% to 60%.

The product of cold pressing is sometimes required to be partially sintered prior to forging (step b). For example, this can be so where the crystalline oxide or nitride ceramic is alumina, silicon nitride, zirconia, lead zirconium titanate or molybdenum disilicide. Sintering temperatures utilized normally range from about 800° C. to 2000° C. to obtain a composite theoretical density ranging from about 50% to about 95%.

The oxide or nitride ceramic can be, for example, selected from the group consisting of lithia-alumino-silicate, barium oxide-magnesia-alumino-silicate, alumina, silicon nitride, zirconia, molybdenum disilicide, lead zirconium titanate, and MgO.2Al$_2$O$_3$ wherein n ranges from about 1 to about 4.5. The precursor thereof is poorly crystalline phase which when reacted to form a fully crystalline phase forms one of the aforementioned—for example, a poorly crystalline phase containing MgO and Al$_2$O$_3$ in a ratio of n moles Al$_2$O$_3$ to 1 mole of MgO which converts to fully crystalline MgO.-2Al$_2$O$_3$ in step (b) herein. Use of said precursors is very beneficial because dynamic phase change from poorly crystalline to fully crystalline during step (b), i.e. during forging, lowers flow stress whereby forging is more readily carried out.

Exemplary conditions for processing to produce various ceramic composites are set forth in Table I below

TABLE I

| Matrix Material | Sintering Temperature (atmosphere) | Forging Temperature (atmosphere) | Strain Rate in Forging (seconds $^{-1}$) |
|---|---|---|---|
| Al$_2$O$_3$ | 1200° C.-1600° C. (argon or air) | 1300° C.-1900° C. (argon or air) | $10^{-6} - 10^{-2}$ |
| Si$_3$N$_4$ (plus conven- | 1400° C.-1900° C. (nitrogen) | 1400° C.-1900° C. (nitrogen) | $10^{-6} + 10^{-2}$ |

TABLE I-continued

| Matrix Material | Sintering Temperature (atmosphere) | Forging Temperature (atmosphere) | Strain Rate in Forging (seconds$^{-1}$) |
|---|---|---|---|
| tional sintering additives) | | | |
| $ZrO_2$ (plus stabilizer additives) | 1000° C.–1400° C. (argon or air) | 1200° C.–1800° C. (argon or air) | $10^{-6} - 10^{-1}$ |
| Pb(Zr, Ti)$O_3$ | 900° C.–1300° C. (argon or air) | 900° C.–1300° C. (argon or air) | $10^{-5} - 10^{-1}$ |
| $MoSi_2$ | 1300° C.–1800° C. (CO/CO$_2$, rich in O$_2$) | 1400° C.–1800° C. (CO/CO$_2$, rich in O$_2$) | $10^{-6} - 10^{-2}$ |

Other variations will be evident to those skilled in the art. Therefore the scope of the invention is intended to be defined by the claims.

What is claimed is:

1. A process for preparing ceramic-ceramic composite net shape parts which are relatively flaw free and need little or nor machining, the ceramic-ceramic composite comprising a uniform dispersion of silicon carbide fibers in a matrix of $MgO.Al_2O_3$, the silicon carbide fibers being present in said composite in an amount ranging from about 10% to about 50% by volume, the $MgO.2Al_2O_3$ being present in said composite in an amount ranging from about 90% to about 50% by volume, said process comprising steps of
    (a) cold pressing a starting powder to obtain a preform of green density ranging from about 30% to about 75% of the theoretical density of the composite, said starting powder comprising particles consisting essentially of a dispersion of silicon carbide fibers in a matrix containing MgO and $Al_2O_3$ in a mole ratio of 2 moles of $Al_2O_3$ to 1 mole of MgO, the silicon carbide fibers and said MgO and $Al_2O_3$ phase being present in relative amounts to provide said volume percentages on formations of $MgO.2Al_2O_3$,
    (b) isothermally sinter forging uniaxially in an open die the preform formed in step (a) to substantially final shape in an inert atmosphere utilizing a temperature within the range of about 1200° C. to about 1625° C. and strain rate within the range of about $10^{-4}$ seconds $^{-1}$ to about $10^{-2}$ seconds $^{-1}$, the temperature and strain rate being such that surface cracks do not occur, said sinter forging being carried out to obtain a shear deformation greater than 30% and a density at least about 98% of the theoretical density of the composite, to provide a matrix of $MgO.2Al_2O_3$ wherein said silicon carbide fibers are uniformly dispersed.

2. A process as recited in claim 1 wherein the starting powder of step (a) is formed by (i) forming an aqueous solution of magnesium nitrate with aluminum hydroxide particles and silicon carbide fibers dispersed therein, the relative amounts of silicon carbide fibers and magnesium nitrate and aluminum hydroxide being such as to provide said volume percentages of said silicon carbide fibers and $MgO.2Al_2O_3$ on conversion of the magnesium nitrate and aluminum hydroxide to $MgO.2Al_2O_3$, (ii) drying to obtain a dry to the touch powder containing uniform admixture of the silicon carbide fibers, (iii) calcining at a temperature ranging from about 600° C. to about 1100° C. to convert the magnesium nitrate to MgO and the aluminum hydroxide to AlO(OH) or to $Al_2O_3$ and to provide a uniform dispersion of the silicon carbide fibers in a resulting poorly crystalline matrix containing the formed MgO and $Al_2O_3$, (iv) size reducing to a matrix material particle size ranging from about 0.005 m$\mu$ to about 5 m$\mu$.

3. Process as recited in claim 1 wherein the silicon carbide fibers are present in said composite in an amount ranging from about 30% by volume to about 50% by volume.

4. Process for preparing ceramic-ceramic composite parts which are relatively flaw free and need little or no machining, the ceramic-ceramic composite comprising a uniform dispersion of silicon carbide fibers in a matrix of oxide or nitride ceramic, the silicon carbide fibers being present in said composite in an amount ranging from about 1% to about 50% by volume, the oxide or nitride ceramic being present in said composite in an amount ranging from about 99% to about 50% by volume, said oxide or nitride ceramic being selected from the group consisting of barium oxide-magnesia-alumino-silicate, lithia-alumino-silicate, alumina, silicon nitride, zirconia, molybdenum disilicide, lead zirconium titanate and $MgO.nAl_2O_3$ wherein n ranges from about 1 to about 4.5, said process comprising the steps of
    (a) cold pressing a starting powder comprising a uniform dispersion of the silicon carbide fibers in a matrix containing oxide or nitride ceramic to form a preform having a density which is about 30% to about 75% of the theoretical density of the composite,
    (b) isothermally sinter forging uniaxially in an open die the preform formed in step (a) which has been partially sintered at atmospheric pressure at a room temperature ranging from about 800° C. to about 2000° C. to a density ranging from about 50% to about 95% of the theoretical density of the composite to substantially final shape utilizing temperature within the range of about 1000° C. to about 2000° C. and strain rate within the range of $10^{-6}$ seconds $^{-1}$ to about 1 seconds $^{-1}$ so as to obtain a density at least about 98% of the theoretical density of the composite and a shear deformation greater than 30% without surface cracks occurring.

5. Process for preparing ceramic-ceramic composite parts which are relatively flaw free and need little or no machining, the ceramic-ceramic composite comprising a uniform dispersion of silicon carbide fibers in a matrix of oxide or nitride ceramic, the silicon carbide fibers being present in said composite in an amount ranging from about 1% to about 50% by volume, the oxide or nitride ceramic being present in said composite in an amount ranging from about 99% to about 50% by volume, said oxide or nitride ceramic being selected from the group consisting of barium oxide-magnesia-alumino-silicate, lithia-alumino-silicate, alumina, silicon nitride, zirconia, molybdenum disilicide, lead zirconium titanate, and $MgO.nAl_2O_3$ wherein n ranges from about 1 to about 4.5, said process comprising the steps of
    (a) cold pressing a starting powder comprising a uniform dispersion of the silicon carbide fibers in a matrix containing oxide or nitride ceramic to form a preform having a density which is about 30% to about 75% of the theoretical density of the composite,
    (b) isothermally sinter forging uniaxially in an open die the preform formed in step (a) to substantially final shape utilizing a temperature within the range of about 1000° C. to about 2000° C. and strain rate within the range of $10^{-6}$ seconds$^{-1}$ to about 1 seconds$^{-1}$ so as to obtain a density at least about 98% of the theoretical density of the composite and a shear deformation greater than 30% without surface cracks occurring.

* * * * *

UNITED STATES PATENT AND TRADEMARK OFFICE
CERTIFICATE OF CORRECTION

PATENT NO. : 4,871,496

DATED : October 3, 1989

INVENTOR(S) : Prakash C. Panda et al

It is certified that error appears in the above-identified patent and that said Letters Patent is hereby corrected as shown below:

On the cover page, under "OTHER PUBLICATIONS", the title of the Burke, J.J., et al article should be --Advances in Deformation Processing-- and the periodical for Bailey, J.T., et al should be --Trans. British Ceramic Society--.

On page 2 under "OTHER PUBLICATIONS" for Hamano, K., et al "85[5" should be --85[5]-- and for Kanzaki, S., et al, Yogyo-Kyokai-Shi, 91, [4]", "1770" should be --170--.

Claim 1, (Column 11, line 22), "nor" should be --no--.

Claim 1, (Column 11, lines 36, 37), change "MgO and $Al_2O_3$ phase" to --matrix--.

UNITED STATES PATENT AND TRADEMARK OFFICE
CERTIFICATE OF CORRECTION

PATENT NO. : 4,871,496

DATED : October 3, 1989

INVENTOR(S) : Prakash C. Panda et al

It is certified that error appears in the above-identified patent and that said Letters Patent is hereby corrected as shown below:

Claim 1, (Column 11, line 38), change "formations" to --formation--.

Claim 4, (Column 12, line 28), delete "room".

Claim 4, (Column 12, line 32), after "utilizing" insert --a--.

Signed and Sealed this

Eighteenth Day of September, 1990

Attest:

HARRY F. MANBECK, JR.

*Attesting Officer*   *Commissioner of Patents and Trademarks*